United States Patent [19]

McBride

[11] 4,086,660
[45] Apr. 25, 1978

[54] AUTOMATIC FORMAT CONTROL FOR TEXT PRINTING SYSTEM

[75] Inventor: Michael Eudell McBride, Austin, Tex.

[73] Assignee: International Business Machines Corporation, Armonk, N.Y.

[21] Appl. No.: 680,562

[22] Filed: Apr. 27, 1976

[51] Int. Cl.² ............................................. G06F 3/12
[52] U.S. Cl. .................................................. 364/900
[58] Field of Search ..................... 340/172.5; 364/200, 364/900

[56] References Cited

U.S. PATENT DOCUMENTS

| | | | |
|---|---|---|---|
| 3,307,154 | 2/1967 | Garth et al. | 340/172.5 |
| 3,501,746 | 3/1970 | Vosbury | 340/172.5 |
| 3,618,032 | 11/1971 | Goldsberry et al. | 340/172.5 |
| 3,786,429 | 1/1974 | Goldman et al. | 340/172.5 |
| 3,829,855 | 8/1974 | Kolpek et al. | 340/172.5 |
| 3,915,278 | 10/1975 | Spence et al. | 340/172.5 |

Primary Examiner—Gareth D. Shaw
Assistant Examiner—Thomas M. Heckler
Attorney, Agent, or Firm—Kenneth W. Hairston; James H. Barksdale; J. Jancin, Jr.

[57] ABSTRACT

An automatic format control for controlling text format upon playout from a text buffer loaded from segmented media, such as magnetic cards. At the beginning of a job and during input keying, format information made up of tab set locations, a measure length, index values, adjust modes, etc., is stored in a text buffer. The keying of this information causes appropriate printer format control settings. Text to be formatted and controlled by the printer according to this format information is then keyed and stored in the text buffer. A later change in format for the same page of the job is handled by keying new format information. This results in new printer tab, etc., settings. This new format information is also stored in the text buffer. Upon later recording onto a magnetic card, all format information is stored on the card along with the text. Also, the last format information recorded on the card is written into a format buffer. This last format information will remain in control until new format information is keyed and stored for a subsequent page. Thus, a history of format information from a previous card will be preserved in the event editing of text overlapping two consecutive cards becomes necessary.

2 Claims, 12 Drawing Figures

AUTOMATIC FORMAT CONTROL FOR TEXT PRINTING SYSTEM

BACKGROUND OF THE INVENTION

1. Field of the Invention

This invention relates generally to text format control. More specifically, this invention relates to automatically controlling the format of printed text upon playout thereof from a buffer loaded from segmented media.

2. Description of the Prior Art

When tape printing systems are considered, there are a number of ways of handling the storing of format information and the later control of format upon playout. One is by storing the format information in a log at the beginning of the tape. Since one recording medium is involved, the log can be accessed and updated, and format can be readily controlled from one page of a job to another. When segmented media, such as magnetic cards, are considered, the use of a format store becomes very important. There are a number of reasons for this. One has to do with human factors in terms of the operator not having to re-key format information at the beginning of each card. Another has to do with accessing where text prior to the last format information is to be retrieved for editing purposes. In this light, consider for example the IBM Mag Card II. Upon power "on", tabs are automatically set every 5 units and a six inch measure is automatically set. These settings are set in a volatile electronic tab rack (random access memory). These settings can be changed by the operator for a particular job. An operator can also store a different format later in the job, including stop codes for tabs and the right margin, for later recording on a magnetic card. Here, the operator must mentally or physically note the location of the right margin setting. Utilizing this routine for changing the format later in the job, a stop code is first stored, the carrier is caused to escape to each desired tab and the right margin, and a stop code is stored for each. The stored information is then recorded on a card. Upon later playout or printout from the card, the reading of the first stop code will cause the printer to stop. The operator procedure is to then depress the gang clear button for clearing all set tabs, cause carrier escapement which will continue until a stop code is read, depress the tab set button for each tab when the carrier stops, recall which stop code is representative of the right margin, and key a coded paragraph advance. The operator must also manually reverse index the platen to reposition the paper, since the coded paragraph causes an extraneous index. With this invention, these human factor and accessing problems are overcome. Now, there is a storing, during input keying, of format information and following text in a text buffer. Upon later recording of the text on a magnetic card, the last input format information is transferred to a format buffer. In order not to affect later pagination changes, the format information in effect at the beginning of each page, except the changes, is not recorded on the cards associated therewith.

SUMMARY OF THE INVENTION

Format control during playout of a job made up of a number of pages recorded on a number of magnetic cards can be handled automatically with this invention. At the beginning of a job and upon input keying, format information is keyed and stored in a text buffer. For format changes prior to recording on a magnetic card, new format information is keyed and stored in the text buffer along with keyed text. Upon recording the text and format information on a card, the format information last in effect is transferred to a format buffer to control format until changed.

DESCRIPTION OF THE PREFERRED EMBODIMENT

OPERATIONS TO BE PERFORMED

Figure 1:
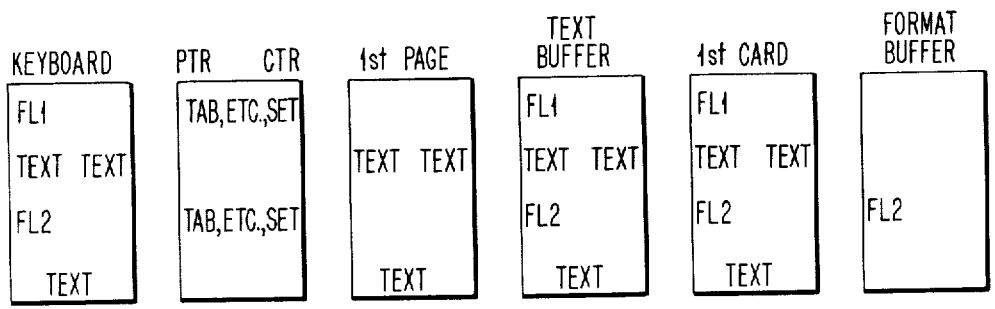
FIG. 1 is a pictorial representation of keyboard information keyed by an operator during input keying for the first page of a job, the first printed page obtained upon input keying, the arrangement of information in a text buffer upon input keying, the information stored on a first magnetic card upon transfer from the text buffer, and the information stored in a format buffer during a transfer from the text buffer to the first card.

For a more detailed description of the invention, reference will first be made to those figures of the drawing which illustrate the operations performed from input keying to card recording, and from card reading to playout. To begin with, it is to be assumed that a card printing system similar to the IBM Mag Card II, having later defined structure incorporated therein, is to be utilized.

Referring first to FIG. 1, there is shown on the left the information keyed by an operator during input keying of the first page of a job. That is, at the beginning of the job, the operator keyed format information such as the location of set tabs, the measure length (location of the right margin), indexing values, adjust or non-adjust modes, etc. through a coded keying sequence to be described hereinafter. This is pictorially represented as format line 1 (FL1). For practical reasons, during the keying of information to form format line 1, it is desireable that the printer be operating in a no-print mode. The reason for this is that confusion during proofreading will be minimized. Upon the keying of format line 1, the operations performed are that tabs, the measure, index values, and the adjust mode are set for the printer in a printer control (PTR CTR). This sets up the printer for printing the first page. Also, format line 1 is stored in the text buffer. Thus, this format information is to control following keyed text.

On the next line of the first page there are shown two columns of text. During input keying of this text, it is stored in the text buffer and printed by the printer according to the settings in the printer control. If the format is to thereafter change to cause text to be centered, new format information must be keyed. When format line 2 (FL2) has been keyed for this change, changes in the tab settings, measure setting, etc., are made in the printer control. This sets up the printer for printing the text to be centered. Also, format line 2 is stored in the text buffer. During the input keying of the text to be centered, it is stored in the text buffer and printed by the printer according to the settings in the printer control.

At the beginning of a recording operation for the transfer of the contents of the text buffer to a magnetic card, format line 1 is read and recorded. Thereafter, the text read out of the text buffer is recorded on the card. Then format line 2 and the following text are read and recorded on the magnetic card. Thereafter, a clearing operation is performed for clearing the text buffer. During this operation, format line 2 is stored in the format buffer. It is important to note that the tabs, etc., set, in the printer control for format line 2, remain set.

Figure 2:
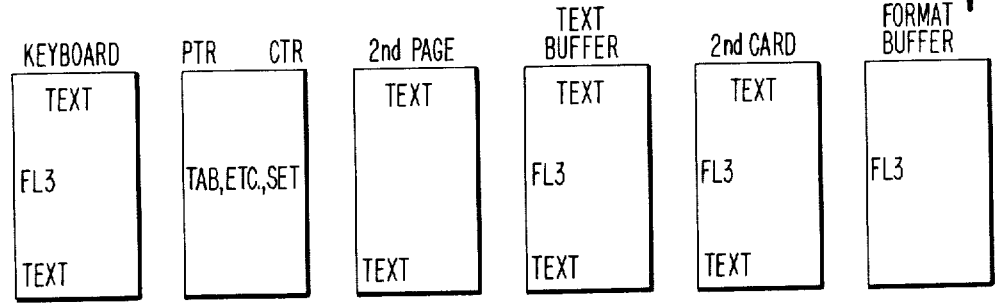
FIG. 2 is a pictorial representation of keyboard information keyed by an operator during input keying for the second page of a job, the second printed page obtained upon input keying, the arrangement of information in the text buffer upon input keying, the information stored on the second magnetic card upon transfer from the text buffer, and the information stored in the format buffer during a transfer from the text buffer to the second card.

Referring next to FIG. 2, there is illustrated the input keying of the second page of the job. From the above, the tabs, indexing, etc., set in the printer control for format line 2 remain in effect. These are also stored in the format buffer. Then, at the beginning of the second page, text to be centered is keyed, printed, and stored in the text buffer. The following text is to be in a flush left format. This will require the keying of a new format line, which in this case will be format line 3 (FL3). Upon the keying thereof, changes in tabs, etc., are set for the printer in the printer control. Also, format line 3 is stored in the text buffer. Following this, the text to be flushed left is keyed, printed, and stored in the text buffer. If at this time, a reverse access operation were performed to access and edit text above format line 3, format line 2 would be recalled from the format buffer as will hereinafter be described. Suffice it to say at this time that tabs, etc. in the printer control would be set according to format line 2 in the format buffer. Then as the editing operation proceeds and format line 3 is encountered, tabs, etc., would be changed for the following text.

At the beginning of a recording operation for the transfer of the contents of the text buffer for the second page to a second card, text is read and recorded. Then, format line 3 and the following text are read and recorded on the card. Thereafter, a clearing operation is performed for clearing the text buffer. During this operation, format line 3 is stored in the format buffer.

From the above, after each page of text has been keyed and printed, the information is then transferred from the text buffer to a magnetic card.

The following summarizes the above and at the same time describes a preferred coded keying sequence for format lines. The operator procedure to change the format from that previously in force is to enter the insert mode for storing keyed information in the text buffer. Then a coded character, such as a coded 5, is keyed. This defines a format line input mode. This will cause a prefix code followed by a stop code to be stored in the text buffer. The operator will then key a required space and a required space code will be stored in the text buffer. This keying will cause a gang clear of all set tabs. Following the keying of the required space, the operator will key additional spaces to cause the carrier to escape to each desired tab point and will then depress the tab set lever. A tab will thus be set and a stop code will be stored in the text buffer. Upon the carrier being positioned at the desired right margin, a carrier return is keyed and a stop code, followed by required carrier return code, are stored in the text buffer. The setting of the right margin upon the keying of the carrier return will cause the format line input mode to be reset. If a normal space is keyed following the coded 5, a gang clear of set tabs will not occur. In this case, the set tabs will remain set, and only the right margin is changed upon spacing the carrier and keying the carrier return.

During later playout, the prefix code, stop code, and required or normal space sequence will be recognized as a format line. This will cause a playout interrupt for set up of the tabs and/or right margin in a tab rack. There will be no printer action during this interrupt. This format line will not be counted as a line for line count purposes, but will be recognized as a line for accessing and editing purposes. For editing purposes after the format line has been completed, the operator procedure will be to delete the line and reenter it. While in the input format mode, the format line can be edited as with normal text, i.e. error correct backspace, etc. Error correct backspacing relative to a set tab will cause the set tab to be reset and the associated stop code to be deleted from the text buffer. In order to insure that the carrier is at the left margin when the format input mode is entered, the operator procedure is to key a required carrier return prior to the keying of the coded 5. This will result in the storing of a required carrier return code prior to the prefix code for causing the positioning of the carrier at the left margin during playout and prior to interrupt.

When the system is interrupted during playout for the format line and a required space follows the prefix and stop codes, there will be a controlled gang clear of all set tabs and the right margin, and a scan of the format line. Following this scan, the tabs and the right margin will be set in the tab rack dependent upon the stop codes and the escapement for the stored and recorded spaces following the prefix code, stop code, sequence. If a normal space code follows the prefix and stop codes, a format line scan is also performed. In this case, only the right margin is reset.

The format line may be stored and recorded separately or intermingled with text. That is, it may be stored alone and then transferred to a card which is to become a separate format card. It may also be stored (1)

at the beginning of a job, or (2) in the middle of a job, where tabs and/or the right margin are to be changed.

When the format line is to control indexing, a different coded character will be keyed following the first. For example, for a double index, two coded i's are to be keyed following the coded 5.

Figure 3:
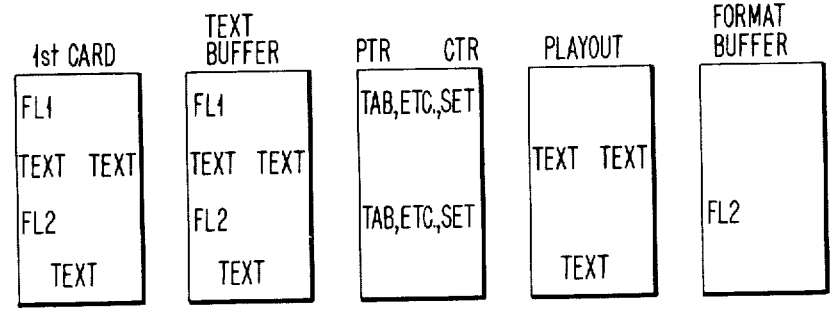
FIG. 3 is a pictorial representation of the first card shown in FIG. 1 which is to be transferred to the text buffer for playout, the arrangement of the text buffer upon transfer from the first card, the information stored in the format buffer, and the playout of the first page.

It is to now be assumed that the operator has completed keying and recording a job on the two magnetic cards described above. Referring next to FIG. 3, the operation of reading information off of the first magnetic card and writing it into the text buffer will be described. The information on the first card is identical to that shown in FIG. 1. Format line 1 and the following text are read from the card and written into the text buffer. Thereafter, format line 2 and following text are read off of the card and written into the text buffer.

For a later playout operation from the text buffer, format line 1 is read. This causes tabs, etc., to be set in the printer control for controlling format during playout upon the reading of the following text from the text buffer. That is, the two columns of text are read from the text buffer and printed during a playout or output printing operation. Thereafter, format line 2 is read from the text buffer. This causes a change in the tab, etc., settings in the printer control for controlling format of the following centered text. Then the text is read and printed. This completes the first page of playout.

During a clearing operation for clearing the text buffer for a subsequent read in of the second card, format line 2 from the first card is stored in the format buffer. The tabs, etc., set for this format line 2 remain set in the printer control to control format of the following page. Of course, it is to be appreciated that at the beginning of the second card, a new format line could be stored. In any event, format line 2 is stored in the format buffer. The reason format line 2 is stored in the format buffer is to retain this format information for reference in the event text is to be edited following this information and on the following page.

Figure 4:
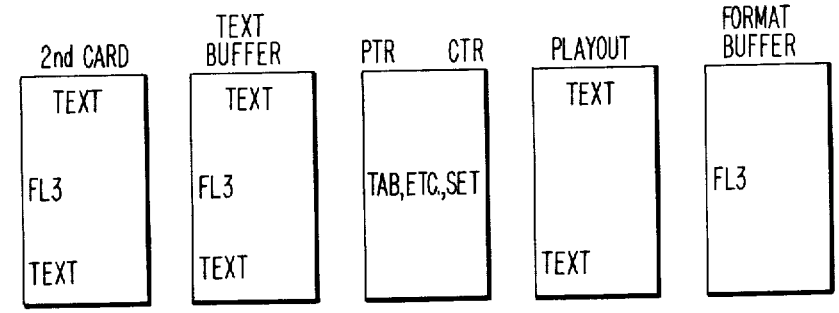
FIG. 4 is a pictorial representation of the second card shown in FIG. 2 which is to be transferred to the text buffer for playout, the arrangement of the text buffer upon transfer from the second card, the information stored in the format buffer, and the playout of the second page.

Referring next to FIG. 4, the information on the second magnetic card is read and stored in the text buffer. Upon reading the text buffer for playout, the centered text is read and printed out according to format line 2. When format line 3 is read, tabs, etc., are set in the printer control for controlling the format of the following text. Then, the following text is read and printed. During a clearing operation for clearing the text buffer, format line 3 is written over format line 2 in the format buffer.

From the above, it has been assumed that following the input keying and storing of the first page in the input buffer, the information contained in the text buffer is stored on the first magnetic card. It is to be appreciated that instead of reading out to a magnetic card from the text buffer, the operator could directly read out of the text buffer to playout the contents of the text buffer in final copy.

TEXT BUFFER INPUT AND OUTPUT

Figure 5:
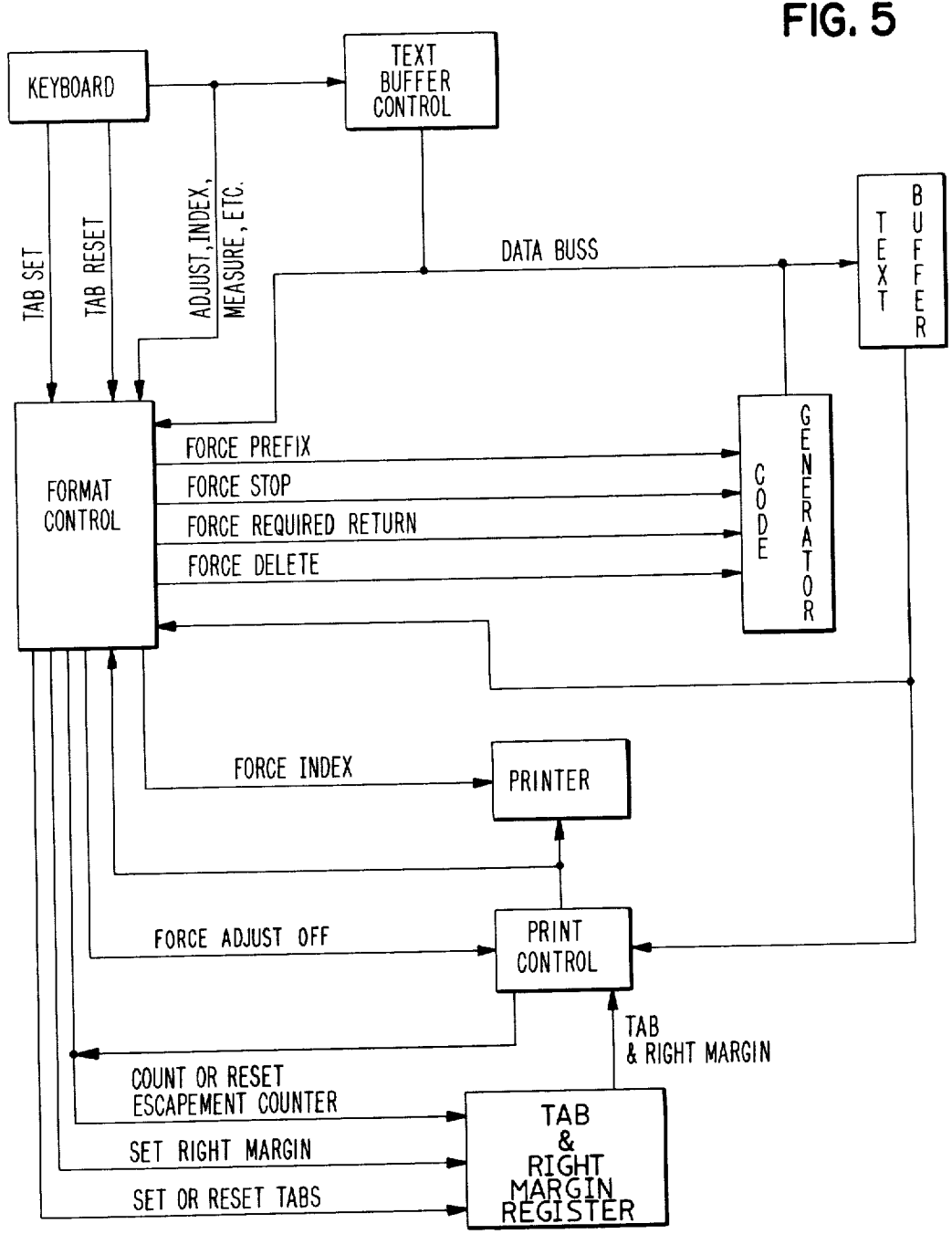
FIG. 5 is an overall block diagram illustrating the structure for performing the operations illustrated in FIGS. 1–4.

Referring next to FIG. 5, there is shown in the upper left hand corner a keyboard. Upon power "on", information is input into both the text buffer and format buffer. That is, tabs are automatically set every five units, a six inch measure is automatically set, etc. Then, upon the keying on keyboard 1 to form format line 1 in FIG. 1, information is input to the text buffer control. The text buffer and text buffer control utilized herein can be considered equivalent to those described in U.S. Pat. No. 3,675,216. The output of the text buffer control is along the data buss to the text buffer. Other outputs from the keyboard are along the tab set and tab reset lines to a format control. The format control will be more fully described later herein. Adjust mode, and index and measure information output from the keyboard to the text buffer control are also output to the format control. The output of the format control is along a number of lines such as force prefix, force stop, force required return, and force delete to a code generator. The code generator contemplated herein can be considered equivalent to that disclosed in U.S. Pat. No. 3,914,745. The output of the code generator is along the data buss to the text buffer. It is to be understood at this point that if a tab is keyed on keyboard 1 for setting a tab, a code in conjunction therewith will also be input to the text buffer from the code generator. Since printing is to occur and be controlled during input keying on the keyboard, the output of the format control is also to the printer along the force index line and to the printer control along the force adjust off line. Other outputs from the format control are count or reset escapement counter, set right margin, and set or reset tab. These are applied to the tab and right margin storage. The tab and right margin storage contemplated herein is a random access memory. As far as the count or reset of both the escapement counter and the tab and right margin storage are concerned, this can occur from the print control. The output of the tab and right margin storage is along the tab and right margin line to the print control.

For a read out from the text buffer for playout, the output of the text buffer is to the format control and to the print control. The output of the print control as with input keying is to the printer and to the format control. Upon reading of the format line from the text buffer, the format control sets up the print control and tab rack. The printer is sampling the printer control at all times. The index mode and adjust mode registers contemplated herein are included in the print control, and will be described later herein when reference is made to subsequent figures of the drawing.

The above description has been directed to a generalized system block diagram. Further details of the print or printer control and the format control will be presented hereinafter. It is to be appreciated that numerous latches, gating devices, etc., necessary for proper timing and gating have been omitted for purposes of clarity.

STRUCTURAL INTERCONNECTIONS

Figure 6A:
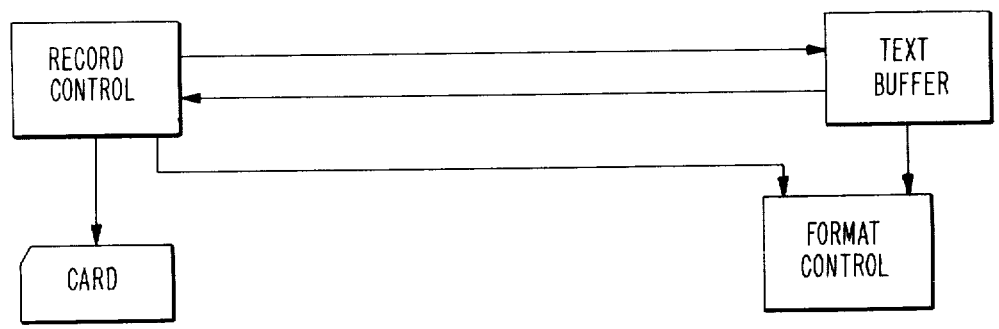
FIGS. 6a–6d illustrate in block diagram form and in more detail the structural interconnections and cooperation involved in performing the operations illustrated in FIGS. 1–4.

Referring next to FIG. 6a, there are pictorially illustrated the interconnections between the record control, text buffer, and format control.

Figure 6B:
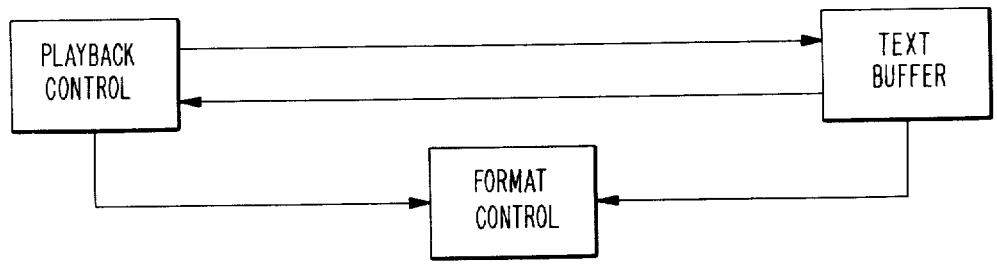

Referring next to FIG. 6b, there are depicted the interconnections between the playback control, text buffer, and format control.

Figure 6C:
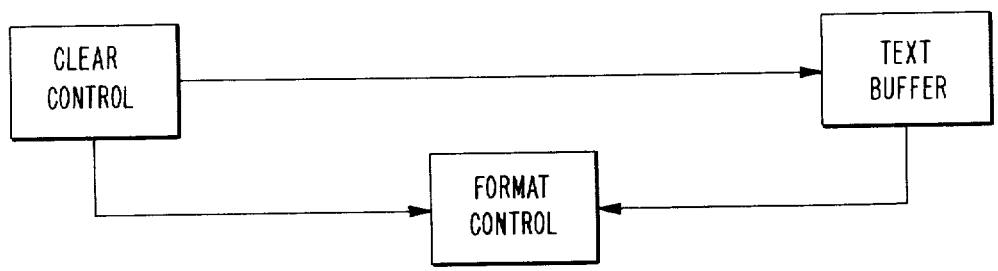

Referring to FIG. 6c, there are depicted the interconnections between the clear control, text buffer, and format control.

Figure 6D:
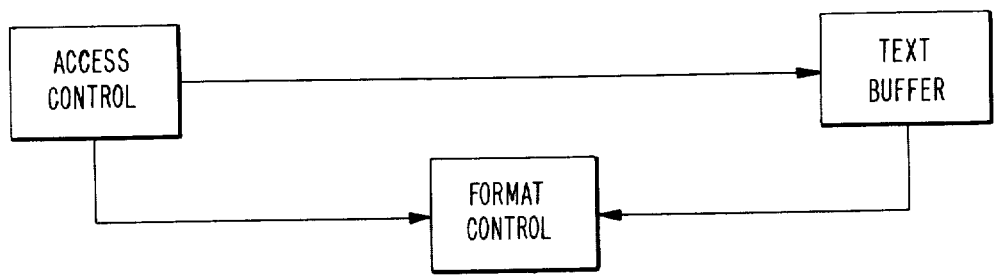

Referring to FIG. 6d, there are illustrated the interconnections between the access control, text buffer, and format control.

Printer Control

Figure 7:
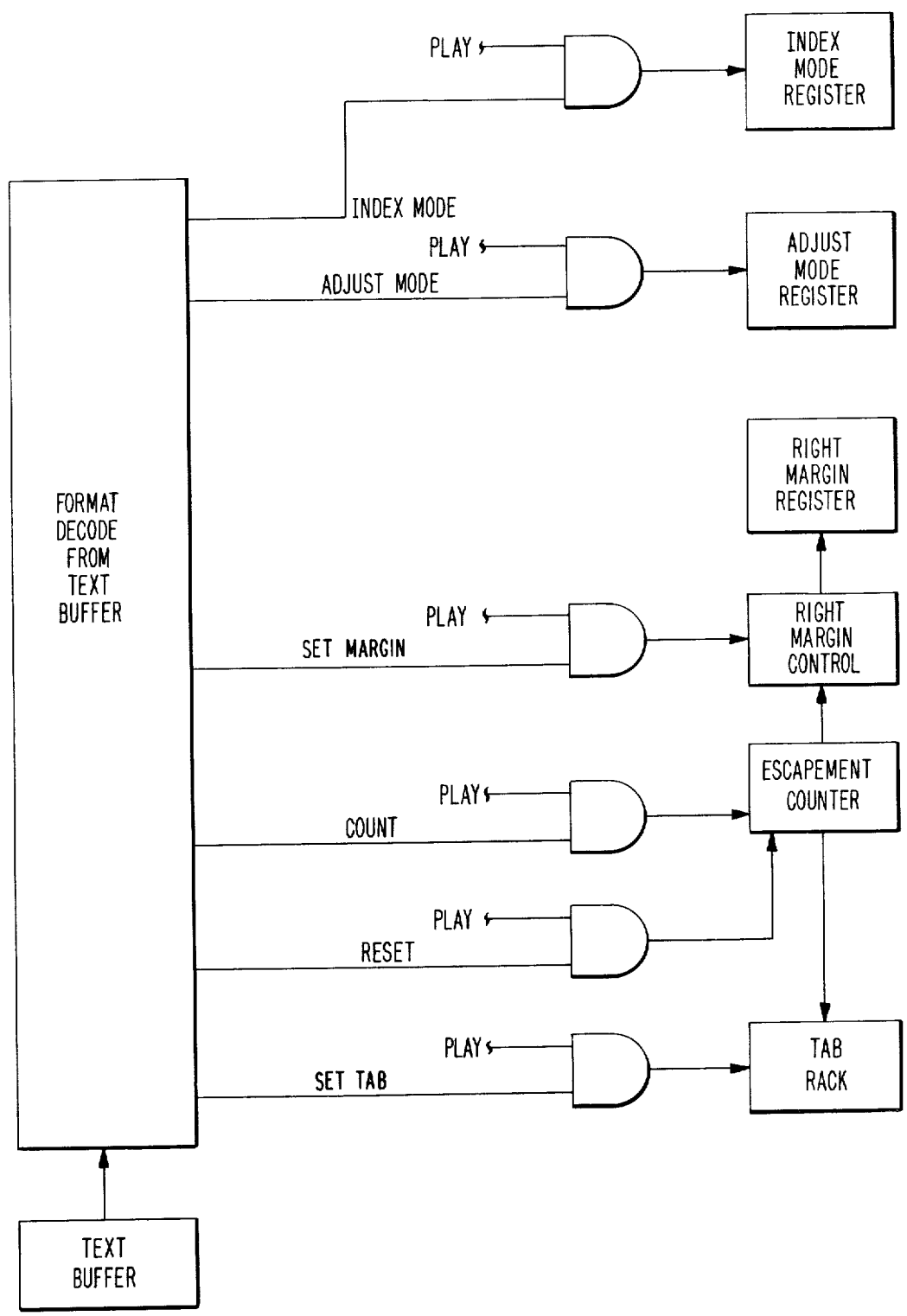
FIG. 7 illustrates the structure utilized for setting the printer control for controlling format of text printed during playout or playback.

Refer next to FIG. 7. Upon the reading of the text buffer during playback, there is a format decoding of the format information contained therein. Before there can be a printing of the first page, the registers, the counters, and random access memory making up the printer control must be loaded and set. Referring to the top center of FIG. 7, an index mode and play signal and AND'ed to gate the index information into the index mode register portion of the printer control. Here, the index information can be either single or double line spacing. Below this, a play signal and adjust mode are AND'ed to gate the adjust mode into the adjust mode register. The mode information here can be adjust or non-adjust. The following AND'ing of the play signals and other signals, such as count, reset, etc., is for setting the right margin in the right margin register and setting tabs in the tab rack. The index mode register and adjust mode register can be simple bistable flip-flops. The escapement counter illustrated can be a resettable up counter. The format decode illustrated can be equivalent to that described in U.S. Pat. No. 3,914,745. The right margin control will be described further later herein. It can be considered to be made up of a number of AND gates for gating the contents of the escapement counter into the right margin register. The right margin register is made up of a series of parallel bistable flip-flops. The structure of each of the above described registers, counters, etc., is considered to be readily available and/or implementable by those skilled in the art.

Figure 8:
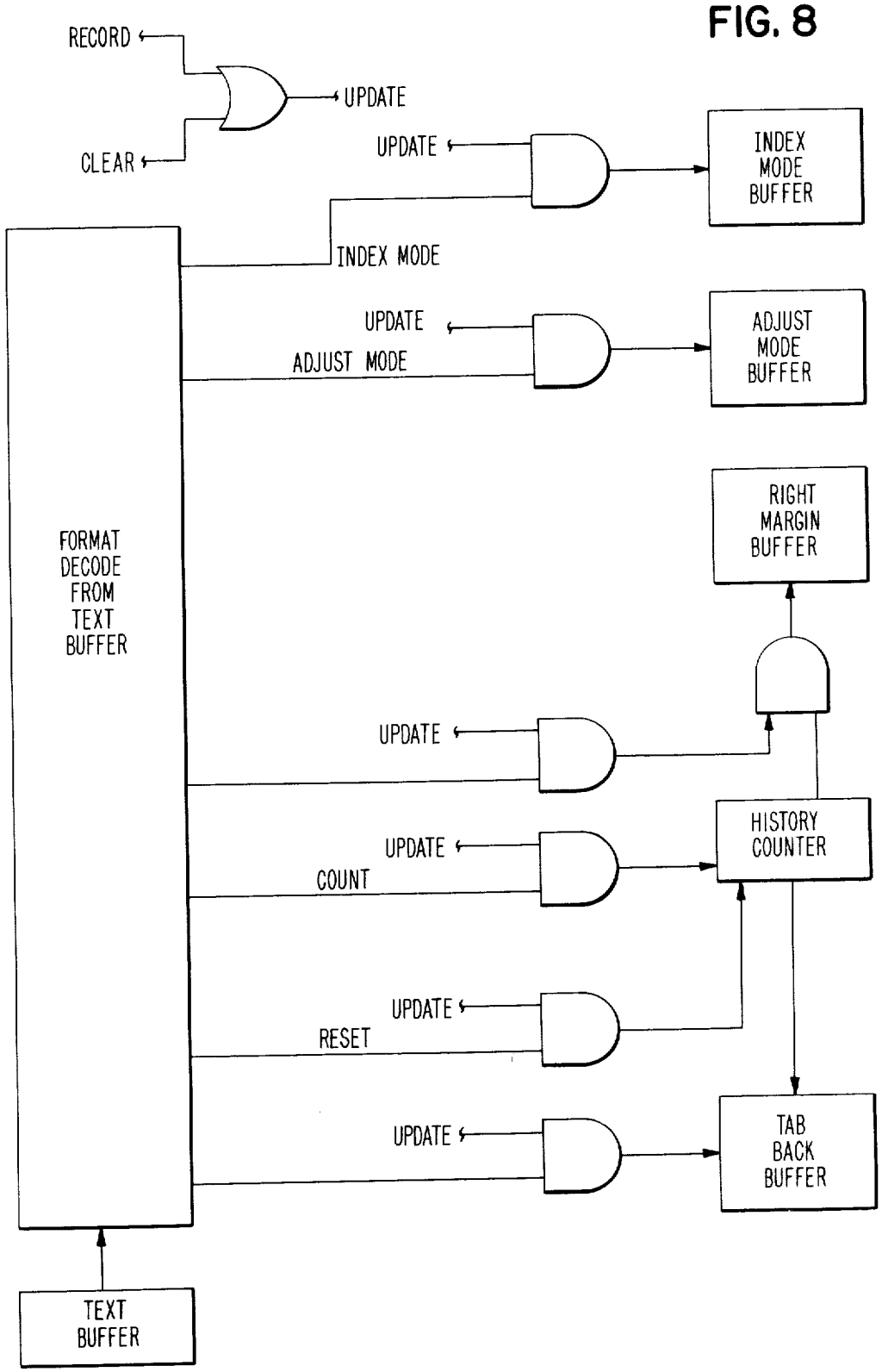
FIG. 8 illustrates the structure utilized for updating the format buffer following a recording operation where information is transferred from the text buffer to a magnetic card, and for clearing the text buffer following a clear command from the keyboard.

Following a recording operation of recording the information in the text buffer onto the first card shown in FIG. 1, the memory must be cleared for keying in and storing information in the text buffer for the second card. Also, during later playback from the recorded cards for editing or format update, the text buffer must be cleared by manual keying after each card is read and printed or edited, to allow reading of the next card. This manual keying is only required for an editing operation or for a format update operation. The control of format for unattended playout is completely automatic. Referring next to FIG. 8, when either the record or clear signal is up, an OR'ed update signal is output. This update signal is AND'ed with an index mode signal from the format decode for storing mode information in the index mode buffer portion of the format buffer. This is for storing the index information for format line 2; assuming that operation is according to FIG. 1. The update signal is also AND'ed with the adjust mode signal from the format decode connected to the text buffer, and the adjust mode buffer portion of the format buffer is set. Other signals such as count and reset are AND'ed with the update signal to store in the right margin buffer and tab rack buffer portion of the format buffer the appropriate information. The format buffer and the format decode are a part of the format control shown in FIG. 5. The index mode buffer, adjust mode buffer, right margin buffer, history counter, and tab rack buffer are equivalent in structure or nature to the index mode register, adjust mode register, right margin register, escapement counter, and tab rack, respectively, shown in FIG. 7.

Reverse Access Operation

Figure 9:
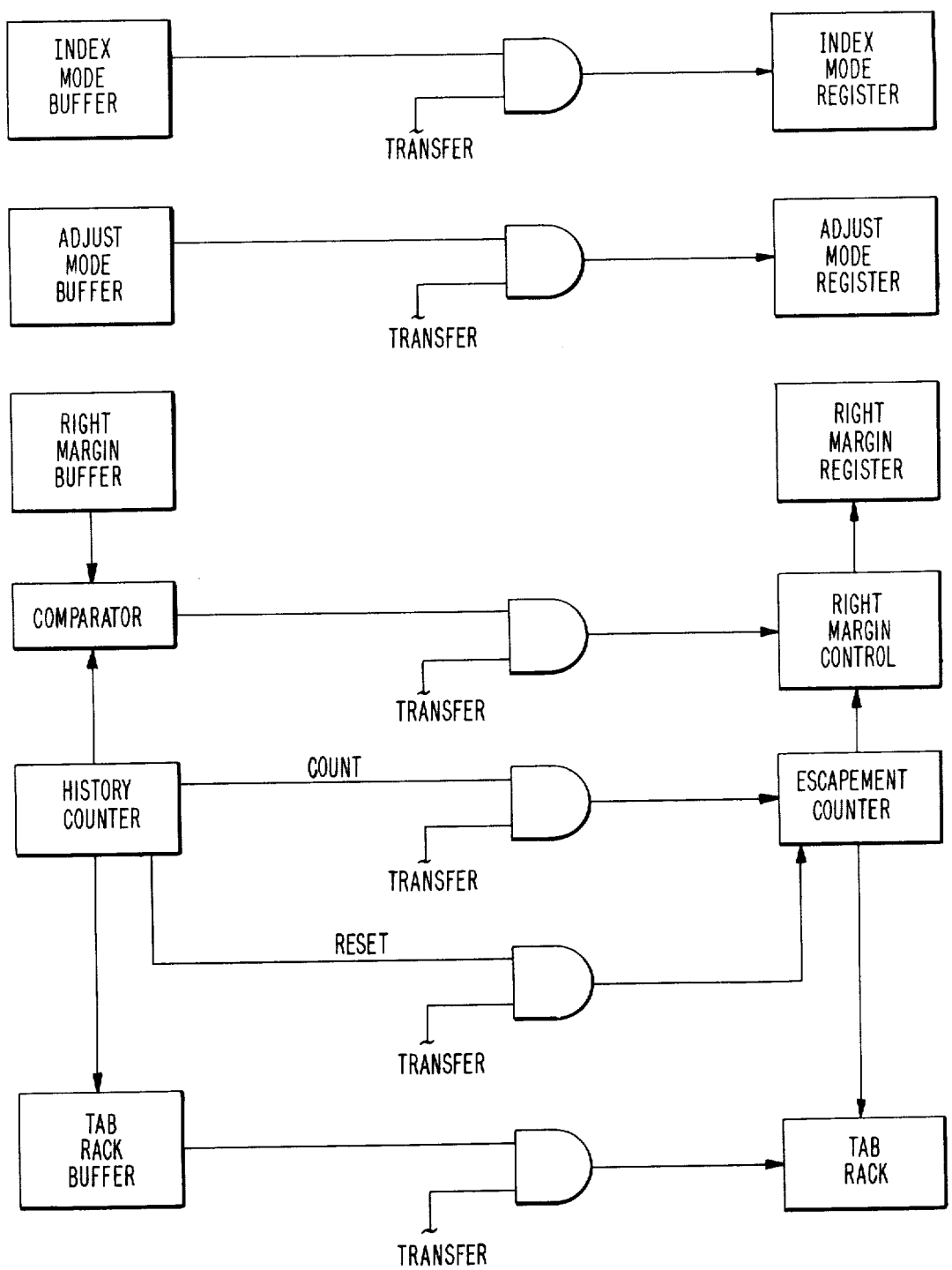
FIG. 9 illustrates the structure utilized during a reverse accessing operation for controlling format.

One of the most important aspects of this invention deals with reverse accessing. As was pointed out earlier, when a single card or a tape are considered, a format line or job log can be effectively used to control format. When a number of cards are considered though, reverse accessing presents a problem in terms of format control. This relates primarily to the history of previous formats in force. Refer next to FIG. 9. For a reverse access operation, a transfer signal is AND'ed with the index mode buffer portion of the format buffer to set the index mode register in the printer control. Also, the adjust mode buffer is AND'ed with the transfer signal to set the adjust mode information from the format buffer into the printer control. The contents of the right margin buffer are compared with the output of the history counter in the format buffer as both this counter and the escapement counter are incremented. This compared information is AND'ed with the transfer signal for gating the contents of the escapement counter register to the right margin portion of the print control.

The escapement counter is controlled by the count obtained from the history counter which is AND'ed with the transfer signal. The output of the tab rack buffer portion of the format buffer is AND'ed with the transfer signal to gate the information into the tab rack. This is also controlled by the escapement counter.

Previous mention has been made of the IBM Mag Card II. Included in the IBM Mag Card II are a reader/recorder for recording text and control information on a card and reading text and control information off of a card and into a text buffer. The text buffer in the IBM Mag Card II is an electronic dynamic shift register. As to the tab rack referred to herein, it is equivalent to the random access memory utilized in the IBM Mag Card II as an electronic tab rack. As to the printer and keyboard, there are also included in the IBM Mag Card II which is presently being marketed by IBM. U.S. Pat. No. 3,772,655 entitled "Method of Obtaining Correspondence Between Memory and Output," assigned to the same assignee as the instant application, and incorporated herein by reference thereto, describes the above-mentioned elements in the IBM Mag Card II as well as other associated apparatus.

In summary, format control during playout of a job made up of a number of pages recorded on a number of magnetic cards can be handled automatically. At the beginning of a job and upon input keying, format information is keyed and stored in a text buffer. For format changes prior to recording on a magnetic card, new format information is keyed and stored in the text buffer along with the keyed text. Upon recording the text and format information on a card, the format information last in effect is transferred to a format buffer to control format until changed.

While the invention has been particularly shown and described with reference to a particular embodiment, it will be understood by those skilled in the art that various changes in form and detail may be made without departing from the spirit and scope of the invention.

What is claimed is:

1. An automatic format control for a text printing system having a keyboard, a text buffer for storing a page of text and format information keyed on said keyboard, a printer control, segmented media for storing text and format information, a reader/recorder for reading text and format information from said media and said text buffer and for causing text and format information to be recorded on said media and stored in said text buffer, and means for causing said printer control to be set upon keying format information on said keyboard; wherein the improvement comprises:

a format buffer; and means for causing format information representative of said printer control setting to be stored in said format buffer upon recording text and format information on one of said media from said text buffer.

2. An automatic format control for a text printing system having a text and format information input from segmented media, a printer for printing said text information, a control for said printer, a text buffer for storing said text and format information from one of said media, a media reader for reading said text and format information recorded on said media for storage in said text buffer, means for reading said text and format information in said text buffer for printing said text information, means for clearing said text buffer following printing of said text information stored in said buffer, and means for causing said printer control to be set each time format information is read from said text buffer; wherein the improvement comprises:

a format buffer; and means for causing format information representative of said printer control setting to be stored in said format buffer upon clearing said text buffer for storing information from another of said media.

* * * * *